United States Patent [19]

Rossbach et al.

[11] 3,740,654

[45] June 19, 1973

[54] SIGNAL CONDITIONING CIRCUIT

[75] Inventors: Dennis R. Rossbach; Dong G. Kim, both of Dayton, Ohio

[73] Assignee: The United States of America as represented by the Secretary of the Air Force, Washington, D.C.

[22] Filed: Mar. 7, 1972

[21] Appl. No.: 232,490

[52] U.S. Cl............. 328/151, 307/235 R, 307/236, 328/118, 328/148

[51] Int. Cl.... H03k 5/153, H03k 5/18, H03k 17/30

[58] Field of Search.................. 307/235 R, 235 A, 307/236, 240, 261; 328/151, 135, 146, 175, 118

[56] References Cited

UNITED STATES PATENTS

| | | | |
|---|---|---|---|
| 3,430,072 | 2/1969 | Stevens | 328/151 X |
| 3,541,319 | 11/1970 | James | 328/151 X |
| 3,585,487 | 6/1971 | McNally | 307/235 X |
| 3,411,018 | 11/1968 | Dapper et al. | 307/235 |
| 3,364,466 | 1/1968 | Stine | 328/151 X |
| 3,479,534 | 11/1969 | Miller | 307/235 X |
| 3,480,795 | 11/1969 | Benson | 307/235 |
| 3,482,174 | 12/1969 | James | 307/240 X |
| 3,528,007 | 9/1970 | Stinson, Jr. | 328/151 X |
| 3,535,658 | 10/1970 | Hagihara | 328/151 X |
| 3,541,320 | 11/1970 | Beall | 328/151 X |
| 3,555,298 | 1/1971 | Neelands | 307/235 |
| 3,586,880 | 6/1971 | Fitzwater, Jr. | 328/151 X |
| 3,588,705 | 6/1971 | Loch | 328/164 X |
| 3,602,825 | 8/1971 | Senior | 307/235 R X |
| 3,638,183 | 1/1972 | Progler et al. | 328/115 X |
| 3,654,561 | 4/1972 | Egawa | 307/235 A X |
| 3,659,211 | 4/1972 | Norton | 307/235 R X |

OTHER PUBLICATIONS

Hansen, "Burst Mode Sampling Amplifier", IBM Tech. Discl. Bull. Vol. 14, No. 7, p. 2196–2197, 12/1971.

DePerna, "Signal is Sampled and Held for 1 Minute", Electronics, May 1, 1967, p. 71–72.

Phalan, "Applications of the Low Input Bias Current Hybrid OP Amp", Electronic Products Magazine, p. 50–51, 6/21/1971.

Hearn, "Applications for Fast Slewing OP Amps", Electronic Products Magazine, p. 54–55, 6/21/1971.

Classen et al., "Transient Measuring Sample & Hold Detector", IBM Tech. Discl. Bull. Vol. 12, No. 8, p. 1233–1234, 1/1970.

*Primary Examiner*—John W. Huckert
*Assistant Examiner*—L. N. Anagnos
*Attorney*—Harry A. Herbert, Jr. and Richard J. Killoren

[57] ABSTRACT

A pulse conditioning circuit having a two-stage feedback amplifier with a bipolar switch between the stages. A logic circuit samples the signal at the summing junction of the feedback amplifier and closes the switch each time the summing junction exceeds a predetermined voltage level. Another portion of the logic circuit closes the switch each time the summing junction exceeds a predetermined negative voltage. A monostable multivibrator, responsive to the summing voltage exceeding a second negative level, provides an output at the level of the sample and hold at that time. The logic circuit has a nor-gate flip-flop which flips one way when the summing voltage exceeds the predetermined positive level and acts to delay the operation of the switch, for a negative voltage of the summing junction, until the monostable circuit has had time to operate.

3 Claims, 3 Drawing Figures

SIGNAL CONDITIONING CIRCUIT

BACKGROUND OF THE INVENTION

Pulse conditioning circuits have been used for providing useable pulses from the irregular shaped pulses as they appear in the signal. In these systems, there usually exists single pulses from which it is desired to produce useable pulses, such as constant width or constant amplitude pulses.

However, as in the copending application of Couch et al "Apparatus for Indicating the Impending Failure of a Jet Engine" filed concurrently herewith, it sometimes occurs that it is desirable to provide useable pulses from pulses that partially overlap. No known circuit is available at present to accomplish this purpose.

BRIEF SUMMARY OF THE INVENTION

According to this invention, a two stage feedback amplifier is operated as a sample and hold circuit. A logic circuit operates a bipolar switch between the two stages to step the sample and hold circuit. The logic circuit also provides an output signal at the level of the sample and hold circuit each time a positive going signal is followed by a negative going signal at the input to the two stage amplifier.

IN THE DRAWINGS

Figures 1, 3:
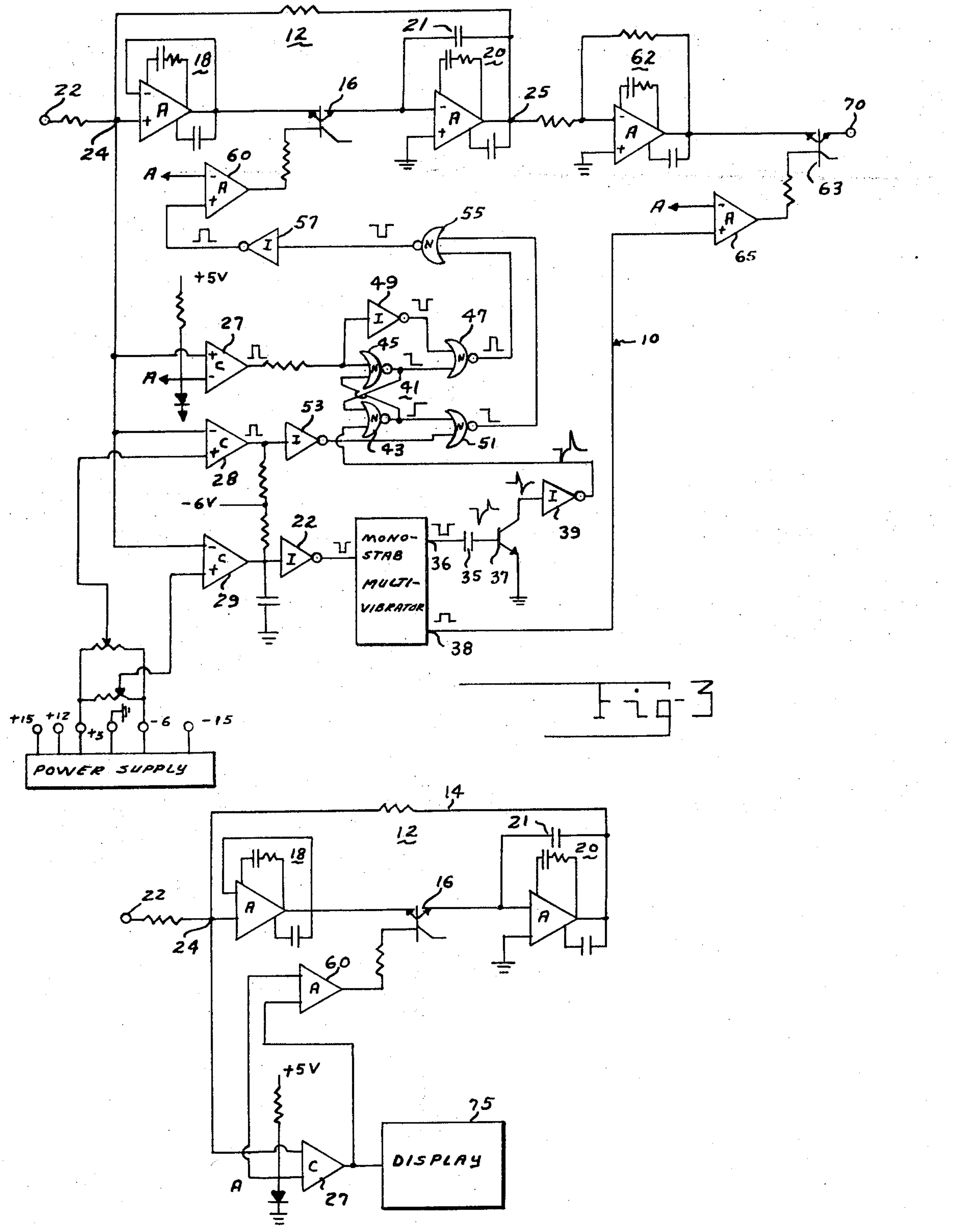
FIG. 1 is a circuit diagram, partly in block form, of a signal conditioning circuit according to the invention.
FIG. 3 is a circuit diagram for a modification of the device of FIG. 1.

Reference is now made to FIG. 1 of the drawing, which shows a pulse conditioning circuit 10 having a two stage amplifier circuit 12 with a feedback path 14. A bipolar switch 16 is connected between the output of the first stage 18 and the input of the second stage 20. The amplifier circuit 12 has a holding condenser 21 in the second stage and functions as a sample and hold circuit.

Figure 2:
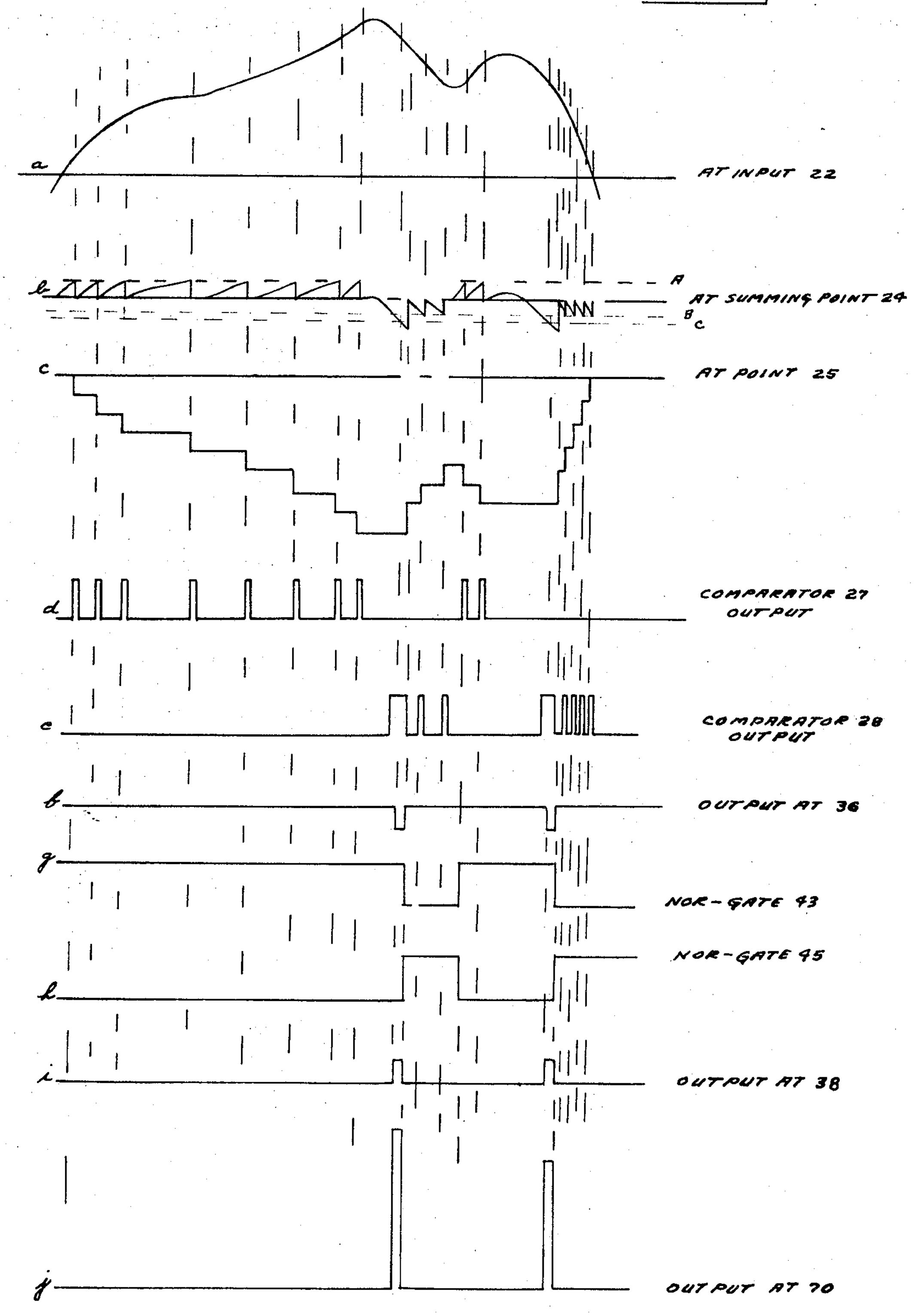
FIG. 2 shows the wave form at different parts of the circuit for a particular input wave form.

An input signal, such as shown at A in FIG. 2, is supplied to input terminal 22. The signal at summing junctio 24 is applied to comparing circuits 27, 28 and 29. Comparator 27 is set to provide an output pulse when the summing junction 24 voltage exceeds some low positive value, for example, 0.7 volts. The comparator 28 is set to provide an output pulse when the summing junction 24 voltage exceeds a low negative value, for example, −0.7 volts. The comparator 29 is set to provide an output pulse when the summing junction 24 voltage exceeds a low negative voltage slightly more negative than comparator 28, for example −0.9 volts. The output of comparator 29 is inverted in inverter 32 and applied to a monostable multivibrator 34. The negative going output of the multivibrator 34 is differentiated and inverted by means of capacitor 35 and transistor 37. The negative peak in the output of transistor 37, corresponding to the trailing edge of multivibrator 34 is inverted in inverter 39 and applied to norgate 43 of the nor-gate flip-flop 41. The other input to the nor-gate flip-flop is provided by comparator 27.

The output of comparator 27 is applied to nor-gate 45 of the flip-flop 41. The output of nor-gate 45 is applied as one input to nor-gate 47, with the second input being provided from inverter 49. The nor-gate 43 supplies one input to nor-gate 51, with the second input to nor-gate 51 being supplied from inverter 53. The outputs of nor-gates 47 and 51 are supplied to a nor-gate 55. The output of nor-gate 55 is inverted by inverter 57 and applied to switch 16 through amplifier 60. The output of stage 20, of amplifier 12, is inverted in amplifier 62 and applied to a second bipolar switch 63. The positive going output pulse, from multivibrator 34, is applied to switch 63, through an amplifier 65, to provide an output pulse at the level of the sample and hold signal for the duration of the pulse from multivibrator 34.

The switches 16 and 63 are double emitter planar transistors. The transistors used were 3N75 produced by Texas Instruments. However, any type of double emitter planar transistors may be used. In some applications, other types of switches might be used such as Field effect MOS transistors.

In the operation of the device, the circuit 12 without switch 16 is a two stage amplifier with negative feedback to the summing junction 24 with the output at 25 being an inverted signal closely following the input at 22. With the switch 16 open, the output at 25 is held at the previous level of the signal at 22, when the switch was closed. When the switch 16 is open, point 24 raises until it reaches the bias level, shown in FIG. 2–6, for the input to comparing circuit 27. When point 24 reaches the level at A, circuit 27 provides a positive going output pulse shown in FIG. 2–*d* which is applied to nor-gate 45 to switch the flip-flop so that the output of 45 is low, as shown in FIG. 2–*h*, and the output of 43 is high, as shown in FIG. 2–*g*. With the output of 45 low and the output of inverter 49 providing low, the output of nor-gate 47 is high. The output of nor-gate 43 being high causes the output of nor-gate 51 to be low so that a continuous low is supplied to the input of nor-gate 55 from nor-gate 51. Thus, the output of nor-gate 55 is low only for the duration of each of the output pulses from nor-gate 47. The negative going pulse in the output of nor-gate 55 is inverted in inverter 57, amplified in amplifier 16 and applied to switch 16. The line from the output of stage 18 is connected to the input of stage 20 for the duration of the pulse so that the output at 25 is raised to the level of the input at 22, as shown in FIG. 2–*c*, and the voltage as the summing junction 24 is returned to ground level, as shown in FIG. 2–*b*. When switch 16 opens, point 24 again begins to rise and point 25 is held at the previous level of signal at 22. Thereafter, each output pulse from comparator 27 provides a negative going output pulse from inverter 49 with the constant low from nor-gate 45 to provide a high output from nor-gate 47 which operates in the manner described above to close switch 16. This continues as long as the signal at 22 is moving more positive.

When the signal at 22 hits a peak and reverses and reaches a level B, shown in FIG. 2–*b*, comparator 28 provides a positive output pulse which is inverted in inverter 53 and applied to one terminal or nor-gate 51. This has no effect at this time since there is a positive level applied from nor-gate 43 of flip-flop 41, as shown in FIG. 2–*g*.

When the signal at summing point 24 reaches level C in FIG. 2–*b*, the comparator 29 provides an output pulse which is inverted in inverter 32 and applied to monostable multivibrator 34 which provides negative going output pulse at 36 and a positive going pulse at 38. The pulse at 36 is differentiated in a differentiating circuit made up of capacitor 35 and the emitter to base resistance in transistor 37. The positive and negative spikes are inverted and amplified by transistor 37 and applied to inverter 39. The negative-going peak corresponding to the leading edge of the output pulse at 36 has no effect on flip-flop 41, but the positive going peak corresponding to the trailing edge of this pulse acts to reverse the flip-flop 41 so that the output of 43 is low and the output of 45 is high. With the output of nor-gate 45 high, a constant low appears in the output of nor-gate 47. With the output of nor-gate 43 low, nor-gate 51 provides a high output each time the output of inverter 53 goes low. Comparator 28, therefore, provides switching pulses for switch 16 during the time that the signal at 22 is going negative.

The duration of the output pulses from comparators 27 and 28 is determined by the time it takes for the voltage at summing junction 24 to return to a level below the levels A and B respectively in FIG. 2–*b*. As can be seen in FIG. 2–*e*, the first pulses from comparator 28 are longer than the remaining pulses since the operation of switch 16 is delayed until the end of the pulse at 36.

The signal at 38 is applied to switch 63 through amplifier 65 to provide an output pulse at output 70. The signal at 25 is inverted in inverter 62 and applied to switch 63 so that the output pulse at 70 is a positive pulse at the level of the sample and hold circuit at that time. The transistor 37 and inverter 39 provide an additional delay in the operation of switch 16 so that the pulse 38 can operate switch 63 before switch 16 is closed to change the level of the signal in the sample and hold circuit. Thus, each output pulse at 38, as shown in FIG. 2–*j*, provides an output pulse of the desired level at output 70.

The curves, shown in FIG. 2, are merely illustrative and are not meant to be actual curves since the switching would be much more rapid than shown and the curve in FIG. 2–*c* would follow the curve shown in FIG. 2–*a* much more closely than shown. Also, the curve shown in FIG. 2–*a* is merely for the purpose of describing the operation of the apparatus and it is to be understood that the apparatus could be used with signals with wave shapes quite different than shown in FIG. 2–*a*.

When it is desirable to provide an indication of rise time or rate of change in the slope of pulses at 22, the circuit of FIG. 3 may be used. The device is the same as in FIG. 1 except that the output is taken at the output of comparator 27 instead of taking the output from the amplifier 12 and the output of comparator 27 is connected to the input of amplifier 60. The output at 27 may also be supplied to a display device 75 or some other type of apparatus such as a pulse counter or a frequency analyzer.

Though not shown, it may be desirable in some applications to provide some delay between the output of comparator 27 and the input of amplifier 60 to increase the pulse width in the output of comparator 27.

There is thus provided an apparatus for conditioning a signal to provide an output pulse each time a positive slope is followed by a negative slope of a predetermined amplitude.

We claim:

1. A signal pulse conditioning circuit, comprising: a two stage feedback amplifier, a switch connected between the output of the first stage and the input of the second stage of said two stage amplifier; means, responsive to the voltage level at the feedback summing junction of said two stage amplifier, for closing said switch when the summing junction voltage exceeds a predetermined value; said means for closing said switch, including means for closing the switch when the voltage level at the summing junction exceeds a predetermined positive level and a second means for closing the switch when the voltage level at the summing junction exceeds a predetermined negative level; means for delaying the closing of the switch, the first time the signal exceeds the predetermined negative level until a predetermined time after the voltage level, at the summing junction, exceeds a second more negative voltage level; said two stage amplifier including means, for holding the voltage in the output of the second stage at the level that exists when the switch is opened, until the switch is again closed; and means for providing an output signal at the level of the output voltage of said second stage when the voltage level at the summing junction exceeds the second more negative voltage level.

2. A signal pulse conditioning circuit, comprising: a two stage feedback amplifier, a switch connected between the output of the first stage and the input of the second stage of said two stage amplifier; means, responsive to the voltage level at the feedback summing junction of said two stage amplifier, for closing said switch when the summing junction voltage exceeds a predetermined value; said two stage amplifier including means, for holding the voltage in the output of the second stage at the level that exists when the switch is opened, until the switch is again closed; said means for closing said switch including a first comparator circuit; a second comparator circuit and a third comparator circuit; a monostable multivibrator connected to the output of the first of said comparator circuits; a nor-gate flip-flop circuit; said nor-gate flip-flop circuit having one nor-gate connected to the output of the second of said comparator circuits and a second nor-gate connected to a first output of said multivibrator; means, in the circuit between the monostable multivibrator and said second nor-gate for delaying the operation of the second nor-gate until the end of the monostable multivibrator output pulse; means, responsive to a second output from said monostable multivibrator circuit for providing an output signal at the level of the output voltage of said second stage of the two stage amplifier at the time of the monostable multivibrator output pulse.

3. The device as recited in claim 2 wherein said means for providing an output signal at the level of the output voltage of said second stage of the two stage amplifier at the time of monostable multivibrator output pulse includes a double emitter planar transistor having one emitter connected to the output of the two stage amplifier with an output connected to the second emitter.

* * * * *